United States Patent [19]

Belov et al.

[11] 4,420,139

[45] Dec. 13, 1983

[54] DEVICE FOR REMOTE CONTROL AN ACTUATOR OF A SHUT-OFF MEMBER

[76] Inventors: Valentin V. Belov, Klenovy bulvar, 8, kv. 47; Vsevolod I. Verkevich, ulitsa Moldagulovoi, 18, korpus 2, kv. 254, both of Moscow, U.S.S.R.

[21] Appl. No.: 179,734

[22] Filed: Aug. 20, 1980

[51] Int. Cl.$^3$ ............................................. F16K 31/122
[52] U.S. Cl. ..................................... 251/28; 48/192; 60/407; 60/409; 91/4 R; 251/26
[58] Field of Search ............... 251/26, 28; 48/190, 48/192; 91/4 R; 60/375, 413, 416, 407, 409

[56] References Cited

U.S. PATENT DOCUMENTS

| | | | |
|---|---|---|---|
| 2,419,375 | 4/1947 | Shartle | 60/375 |
| 3,100,965 | 8/1963 | Blackburn | 91/4 R |
| 3,114,297 | 12/1963 | Gizeski | 251/26 |
| 3,604,679 | 9/1971 | Pennington | 251/26 |
| 4,034,958 | 7/1977 | Masclet | 251/28 |
| 4,120,478 | 10/1978 | Hasegawa | 251/26 |
| 4,223,531 | 9/1980 | Fukunaga et al. | 91/4 R |
| 4,296,910 | 10/1981 | Gratzmüller | 251/28 |

FOREIGN PATENT DOCUMENTS 2264463   4/1976   Fed. Rep. of Germany .

OTHER PUBLICATIONS

R. Molle, Hydraulic and Pneumatic Components of Automatic Devices, Russian Edition of 1972, pp. 90-94, 238 and 239, Dunod, Paris 1967.
J. M. Bashta, Hydraulic Drives and Hydro-Pneumatic Automatic Control, Mashinoslroenie Publishers, Moscow, 1972, pp. 67-72.
Service Manual No. 649577 for a 300 mm diameter, 75 Kgf/cm$^2$ ball valve, by the Firm Saut du Tan, France.

Primary Examiner—George L. Walton
Attorney, Agent, or Firm—Lilling & Greenspan

[57] ABSTRACT

A device for remote control of actuator of a shut-off member comprises an autonomous source of energy and a distributor connected therewith. The autonomous source of energy is fashioned as two units, each unit containing at least two gas generators with igniter means, a pneumatic OR gate and a selector. The input of each unit is connected to a corresponding control channel while outputs are connected to respective input and control channels of the distributor. The present invention improves the reliability of control of the shut-off member and facilitates the maintenance of the device during operation.

1 Claim, 3 Drawing Figures

4,420,139

DEVICE FOR REMOTE CONTROL AN ACTUATOR OF A SHUT-OFF MEMBER

FIELD OF THE INVENTION

The present invention relates to the field of pneumoautomatics and, more particularly, it relates to a device for remote control of an actuator of a shut-off member.

The herein disclosed device for remote control of the actuator of a shut-off member can be used most advantageously for control of pneumatic actuators and pneumohydraulic actuators of shut-off members in gas industry. The invention can also find application in petroleum, chemical and other industries for use in appropriate shut-off members.

BACKGROUND OF THE INVENTION

There is known in the art a device for control of shut-off members (cf., U.S.S.R. Inventor's Certificate No. 508,630, class F 16 K 31/52, of May 11, 1973). Said prior art device lacks remote control, thereby precluding the possibility of its use with telemechanical systems and of operational control shut-off members, which results in a reduced reliability of control of the actuator of a shut-off member.

Also known in the art is a device for remote control of the actuator of a shut-off member, namely, EPUU-2 Electropneumatic Control Unit (cf., Catalogue "Systems and automatic means for installations of gas industry", Vsesojusnoye Nauchno Proizvodstvennoye Objedineniye "Soyuzgasavtomatika", Moscow, 1976) The device comprises three three-way valves, each having a manual drive and a solenoid.

The solenoids provide for the switching of the valves depending upon the inlet electrical control signal, each valve communicating the supply line of the device with the control line, or the control line with a line for the discharge of gas to the atmosphere. The device utilizes conveyed natural gas. More often than not, the quality of purification and drying of the natural gas is inadequate. At negative ambient temperatures, hydrate jams are formed in pulsed lines, valves and slide valves, which results in low reliability of operation and in misfiring, i.e., in a reduced reliability of control of the actuator of a shut-off member. This prior art device requires the provision of a drying filter and, consequently, for permanent servicing.

There is further known in the art a device for remote control of the drive of a shut-off member (cf., F.R.G. Pat. No. 2,264,463, class F 16 K 31/12, of Apr. 26, 1972), which comprises an autonomous source of energy in the form of an electrically driven supercharger and a distributor connected thereto. The device is remote-controlled, for which purpose the distributor fashioned as a pair of on-off slide valves is controlled electromagnetically. The presence of a supercharger with a non-return valve and additional container, distributing pipeline and electromagnetic control complicates the structure and, thereby, affects the reliability of control over the shut-off member. In addition, this prior art device requires a rather powerful and continuous input electrical signal and cannot operate from command pulses issued by telemechanical systems. This also reduces the reliability of control of a shut-off member. The prior art device requires permanent servicing in operation.

SUMMARY OF THE INVENTION

It is an object of the present invention to develop a device for remote control of the actuator of a shut-off member, featuring an increased reliability of control over said shut-off member.

It is also an object of this invention to develop a device for remote control of the actuator of a shut-off member, that would help facilitate its servicing in operation.

The objects are attained by a device for remote control the actuator of a shut-off member, comprising an autonomous source of energy and a distributor connected thereto and to the drive of the shut-off member. According to the invention, the autonomous source of energy is fashioned as two units, each unit including at least two gas generators with igniter means, a pneumatic OR gate and a selector. The input of the selector is connected to a corresponding control channel, and its outputs are connected to the igniter means of the gas generators, whose outputs are in turn connected with inputs of the OR gate and control inputs of the selector. The output of each one of said units is connected to respective input and controlling channels of the distributor.

The present invention allows considerable improvement of the reliability of control of the actuator of a shut-off member over the channels of telemechanical systems, thereby reducing the probability of emergency conditions in a gas line under control. The invention also helps reduce maintenance costs.

BRIEF DESCRIPTION OF DRAWINGS

This invention will be better understood upon considering the following detailed description of an examplary embodiment thereof, with due reference to the accompanying drawings, in which.

DETAILED DESCRIPTION OF THE INVENTION

Figure 1:
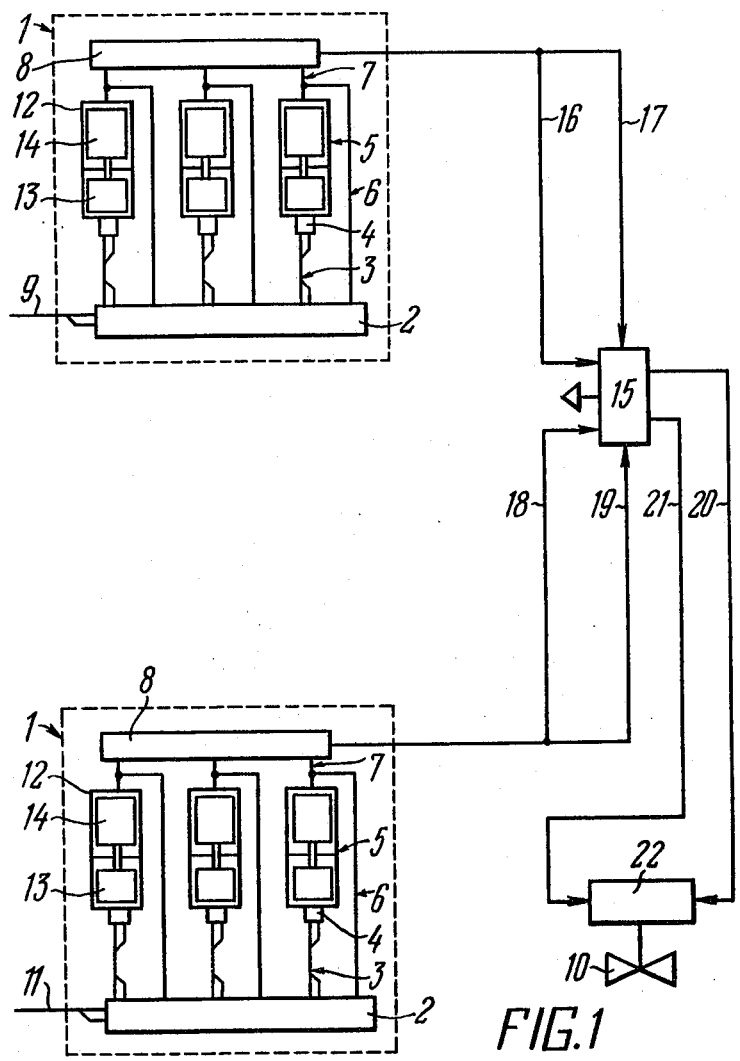
FIG. 1 is a general schematic view of the device for remote control of the actuator of a shut-off member, according to the present invention.

Referring now to FIG. 1 of the accompanying drawings, the herein disclosed device for remote control of the actuator of a shut-off member comprises an autonomous source of energy fashioned as two units 1. Each unit includes a selector 2 whose outputs 3 are connected with igniter means 4 of three gas generators 5 whose outputs are, in turn, connected via communication lines 6 to control inputs of the selector 2 and communication lines 7 to a pneumatic OR gate 8.

The OR gate 8 is based on well-known principles (cf., The book "Pnevmoavtomatika" by B. B. Bulgakov and A. I. Kubrik, published by the publishing house "Tekhnika" USSR, Kiev, 1977, pp. 82–83).

An input of selector 2 of the first unit 1 (the upper unit in FIG. 1) is connected to a channel 9 for remote control opening of a shut-off member 10, while a selector input of the second unit 1 (the lower unit in FIG. 1) is connected to a channel 11 for remote control closing of the shut-off member 10.

Each one of the gas generators 5 includes a case 12, solid fuel 13 and a chemical cooler 14.

The herein disclosed device for remote control of the actuator of a shut-off member further comprises a distributor 15 connected via communication lines 16 and 17 and 18 and 19 to an output of each unit 1, and via communication lines 20 and 21 to an actuator 22 of the shut-off member 10.

The distributor 15 includes a case 23 (FIG. 2) and a slide valve 24, input channels 25 and 26 connected to the communication lines 16 and 18 and control channels 27 and 28 connected to the communication lines 17 and 19, as well as output channels 29 and 30 connected to the communication lines 20 and 21 and an output channel 31 communicating with the atmosphere.

Figure 3:
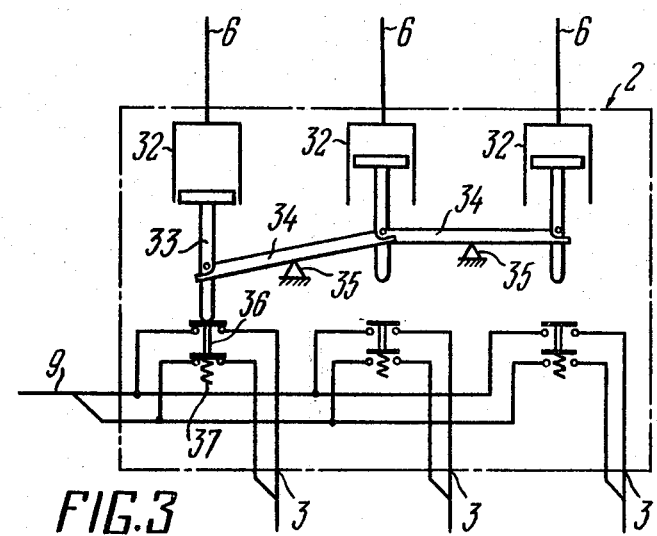
FIG. 3 is a schematic diagram of the selector, according to the invention.

The selector 2 (FIG. 3) includes three pneumatic actuators 32 whose control inputs are connected to the communication lines 6, rods 33 of the pneumatic actuators 32 being interconnected by means of levers 34 with supports 35 and three twin contacts 36 with springs 37. The contacts 36 are connected to the outputs 3 and to the remote control channel 9 of one unit 1, or to the remote control channel 11 of the other unit 1.

The device according to the invention operates in the following manner.

Upon delivery of a control signal via channel 9 of remote control for the opening of the shut-off member 10 (FIG. 1) connected with one of the units 1 to the selector 2, one of the three twin contacts 36 (FIG. 3) is closed while the remaining contacts are opened. Via closed contact 36, the signal is supplied to the output 3 of the selector 2 and further to the igniter means 4 (FIG. 1) of the gas generator 5. Solid fuel 13 is ignited in the gas generator 5, as a result of which a high-pressure, high-temperature gas is generated within the case 12. After interaction with the chemical cooler 14, the gas temperature decreases. Part of the gas from the gas generator 5 is delivered via communication line 6 to the pneumatic actuator 32 of the selector 2 (FIG. 3) which should affect the next open contact 36. At the same time, the rod 33 of the actuator 32, to which gas has been supplied from the gas generator 5 (FIG. 1), closes the contact 36 (FIG. 3) and, by means of the levers 34 with the supports 35, moves upwards the rods 33 of the unloaded pneumatic actuators 32. Thus, the selector 2 is prepared for subsequent operation.

From the activate gas generator 5, gas is delivered via communication line 7 (FIG. 1) to the pneumatic OR gate 8 and further via communication line 16 to the channel 25 (FIG. 2) and via communication line 17 (FIG. 1) to the controlling channel 27 (FIG. 2) of the distributor 15.

At the same time, the slide valve 24 moves within the case 23, and gas from the channel 25 passes to the output channel 29 and further via communication line 20 to the actuator 22 (FIG. 1) to cause opening of the shut-off member 10. The channel 26 and the output channel 30 are connected with the channel 31. At the same time, the communication lines 18 (FIG. 1) and 21 are communicated to the atmosphere.

Figure 2:
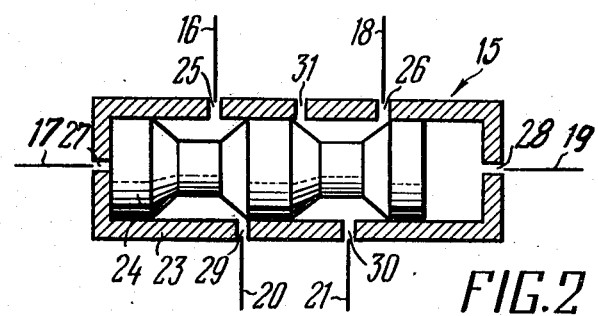
FIG. 2 is a longitudinal view, partly in section, of the distributor, according to the invention.

Upon delivery of the control signal via the channel 11 for remote control closing of the shut-off member 10 coupled with the other unit 1, the device of the invention operates as described hereinabove, the only exception being that the gas from the unit 1 is supplied to the channel 26 (FIG. 2) of the distributor 15 via the communication line 18 (FIG. 1) and via communication line 19 to the control channel 28 (FIG. 2). At the same time, the channels 26 and 30 get connected, and gas is supplied via communication line 21 to the actuator 22, which results in the closing of the shut-off member 10 (FIG. 1).

The communication lines 16 and 20 are communicated to the atmosphere via channels 25 (FIG. 2), 29 and 31 of the distributor 15.

Therefore, the process of opening and closing the shut-off member 10 (FIG. 1) can be repeated as many times as there are gas generators 5 in each unit 1.

Following a full utilization of all of the gas generators 5, one should recharge the units 1 of the device.

Periodical recharging of the units 1 of the device is done at the time of periodical inspection of the actuator of the shut-off member 10.

The herein disclosed device for remote control over the actuator of a shut-off member requires practically no servicing in operation.

The present invention features a high degree of unification and can be used with practically any types of shut-off members.

This invention allows considerable improvement of the reliability of control of the actuator of a shut-off member over the channels of telemechanical systems, thereby reducing the probability of emergency conditions in a gas line under control. The invention further allows a reduction of maintenance costs.

What we claim is:

1. A device for remote control of the actuator of a shut-off member, said device connected by means of first and second control channels, for respectively opening and closing said shut-off member, to a remote control system, comprising:
    an autonomous source of energy including a first unit and a second unit;
    each one of said units of said autonomous source of energy comprising
    at least two gas generators having an output and an igniter means;
    a pneumatic OR gate having an output and inputs connected to said outputs of said gas generators; and
    a selector having outputs connected to said igniter means of said gas generators, control inputs connected to said outputs of said gas generators, and an input of said selector of said first unit of said autonomous source of energy connected to said first control channel and an input of said selector of said second unit of said autonomous source of energy connected to said second control channel;
said device further comprising:
a distributor connected to said actuator of said shut-off member having first and second input channels and first and second control channels, said output of said OR gate of said first unit of said autonomous source of energy connected to said first input channel and to said first control channel of said distributor, and said output of said OR gate of said second unit of said autonomous control source connected to said second input channel and said second control channel of said distributor, wherein gases from the outputs of said OR gates of said first and second units effect operation of said distributor to selectively and alternately open and close said shut-off member.

* * * * *